CARD SELECTION AND EXTRACTION MEANS

Filed Nov. 26, 1965 2 Sheets-Sheet 1

INVENTOR.
GEORGE E. ZENZEFILIS

BY Angus & Mon

ATTORNEYS.

Sept. 10, 1968 G. E. ZENZEFILIS 3,400,721

CARD SELECTION AND EXTRACTION MEANS

Filed Nov. 26, 1965 2 Sheets-Sheet 2

INVENTOR.
GEORGE E. ZENZEFILIS
BY Angus & Mon
ATTORNEYS.

United States Patent Office 3,400,721

Patented Sept. 10, 1968

3,400,721

CARD SELECTION AND EXTRACTION MEANS

George E. Zenzefilis, Camarillo, Calif., assignor to Computer Accessories Corporation, Goleta, Calif., a corporation of California Filed Nov. 26, 1965, Ser. No. 510,020
4 Claims. (Cl. 129—16.1)

ABSTRACT OF THE DISCLOSURE

This invention relates to card selection means for extracting a selected one of a stack of cards from a holder. The holder is carriage-mounted for reciprocable motion along an ejection axis. The carriage is driven by accelerator means which includes one spring to store energy to drive the holder, and another spring to decelerate it. Engagement and retention means restrain to the holder the non-selected cards, so that the selected card, which is accelerated with the holder and the other cards, is expelled when the holder and the other cards are decelerated.

SPECIFICATION

This invention relates to the handling of data-bearing cards. In many fields, but especially in the field of computer operations, data are stored on thin, flexible cards, to which access must be had for the use of the data which they carry. Such cards are customarily stored in stacks, which stacks are often held in racks or other types of housing. In order for the card to be used at all, it must be located, extracted from its stack and used, and then returned to its stack. Usually the card must be returned to the location from which it was extracted. All of these operations consume time and, furthermore, each requirement which must be fulfilled involves the risk of error in selection or in refiling. In addition, because these cards must be handled at quite rapid rates, wear on them is significant, and after a time they must be replaced.

It is an object of this invention to provide means which can be operated rapidly, which can segregate and extract a desired card from a stack of cards, without inflicting any significant damage upon either the extracted card or upon those cards which are retained in the stack.

It is an additional object of this invention to provide a card selector in which a desired card can be located and extracted upon the basis of its title or content alone, and without having to have previous knowledge of its exact location in any given stack, or even in which of several stacks it might be located. Machines of the class which can accomplish this type of selection are generally known as content-address machines. This title distinguishes them from fixed-address machines. In this latter class, the cards must be uniquely ordered and a card, in order to be found at all, must be held in an exactly known location. After use, it must be returned to this precise location. Evidently, a machine which need not refer to a specific location, and which need not retain a card at that place, is inherently more flexible than one which must. Furthermore, the more flexible machine is adaptable for use with interchangeable card containers or cassettes which permit eventual access to a wide range of off-line information storage.

Card selection means according to this invention is adapted to select a designated card among a group of cards. These cards are assembed in a group having adjacent edges. Each card incorporates near its respective edge, coded retention means which is respective to said individual card. The selection means has an ejection axis, and comprises a holder for holding the cards. A carriage supports this holder. Acceleration means acelerate and declerate the carriage so as to accelerate and decelerate the cards with respect to the ejection axis. Each of the cards is at some time aligned with this axis. Restraint means is carried by the carriage, which restraint means has a plurality of engagement means adapted to engage respective ones of said retention means. Selector means is provided for selecting and causing the engagement means to engage retention means which will restrain to the holder all but a designated, selected, one of said cards.

The invention will be fully understood from the following detailed description and the accompanying drawings in which.

Figures 1, 2, 3:
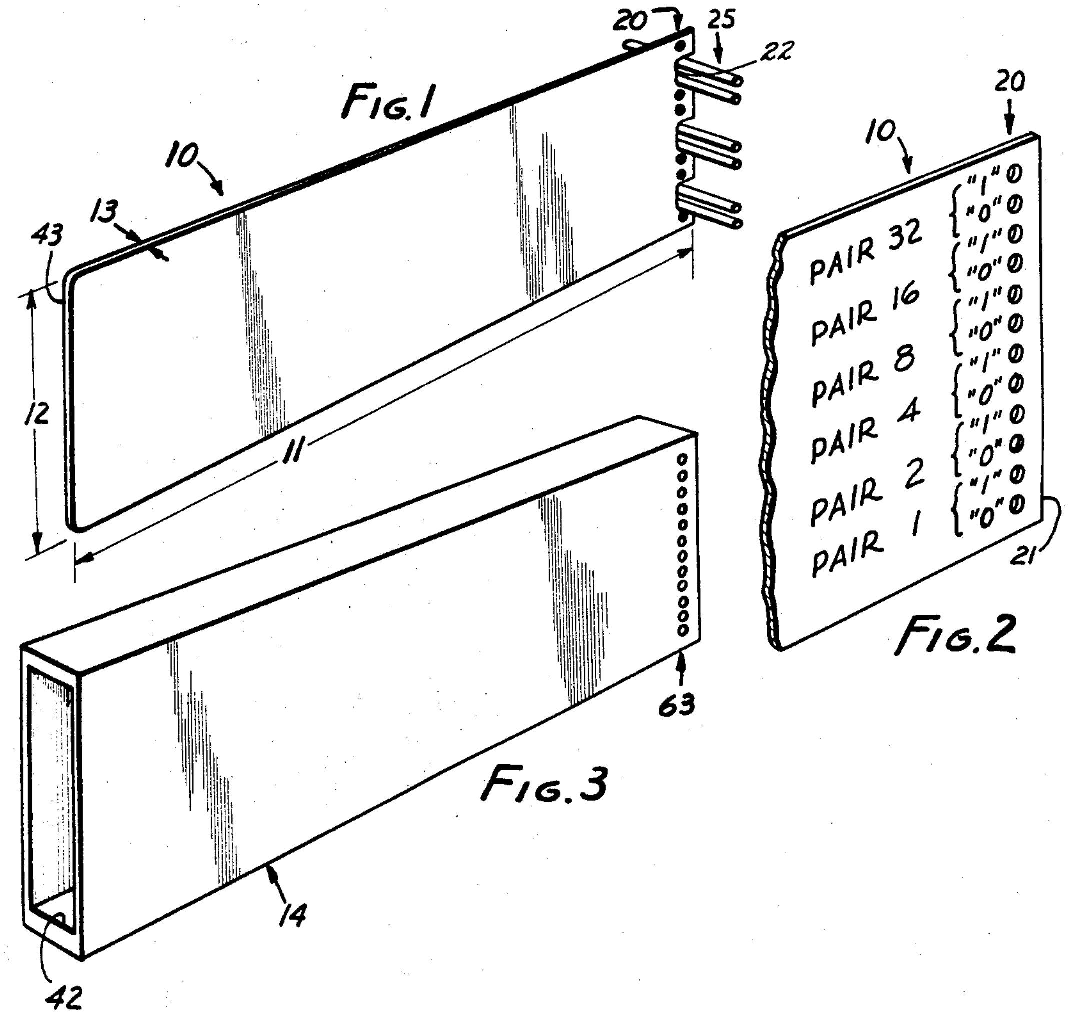
FIG. 1 is a perspective view showing a card according to the invention, including retention and restraint means associated therewith.
FIG. 2 is a fragmentary view of a portion of FIG. 1 showing the coding scheme of the retention means.
FIG. 3 is a perspective view of a holder suitable for use with the invention.

FIGS. 1–3 show the selection technique of the invention, and disclose a coded card 10 having dimensions of length, width and thickness 11, 12, 13, respectively. Data, which may be in magnetic form or otherwise, is stored on the area defined by the length and the width. It is common practice to store these devices in housings such as a cassette 14 (FIG. 3) in a stack 15, whereby the cards are contained in flat surface-to-surface contact. Alternatively, they may be stored in a spoke configuration around a central axis.

In order to code the card, a simple binary code is utilized, and the code as used is shown in FIG. 2. As illustrated therein, six pairs of hole locations provide for a six-bit binary number. Twelve code holes 20 are possible near an edge of the cards, which edges lie next to each other, whether in flatstack or rotary array. The members of each pair of holes may be engaged or not engaged selectively in order to restrain a selected card. Of course, for a card to escape, there needs to be at restraint edge 21 a slot or other means to the hole location which will permit the escape of the cards bearing the correct code, and also there must be some closed holes which would be engaged by the restraint means to prevent the escape of all other cards.

For example, in FIG. 1, there is shown a card which is able to escape from the stack. Code hole locations are disposed equidistant from each other, and the holes are intended to be equal in diameter. The hole locations are grouped in pairs, and it is stipulated that in any pair, one hole will be closed and the other will be accessed (opened) as by slot 22. Engagement means in a closed hole will hold the card in the stack. Engagement means in an accessed hole will not hold the card.

Each card will be issued a serial number for convenience, starting from zero and ending at number $n-1$. For maximum economy of the commonly available mechanisms, the total number of cards $n$ will be an integral power of 2, thus $n$ equals $2^p$, $p$ equalling the number of pairs of hole locations. In FIG. 2, $p=6$.

The combination of closed or accessed holes is formed by expressing the number of each card in binary form and accessing either the 1 or the 0 hole of each pair as the case may be. In the illustration, card number 21 is expressed in binary form as $$32(0)+16(1)+8(0)+4(1)+2(0)+1(1)$$

hence the accessed holes as shown. To make for better clearances, regions between adjacent pairs of accessed holes are removed. Only the closed holes function to retain the cards, so this removal is of no functional importance.

There are provided engagement means in the form of removable pins 25. There are $2^p$ of these pins, one for each hole location. They are inserted or removed by restraint means yet to be described. These pins may be inserted or removed to form a binary coded number. Thus it will be evident that, when a coded edge accessed to correspond to the selected pin code is engaged by these pins, that card and no other will be free. No other card can be free, because at least one of these pins will engage every other card at a closed hole, and hold it. This is the scheme of the card and restraint code technique. The remaining portion of the invention relates to means readily to extract the card from its holder.

Figure 4:
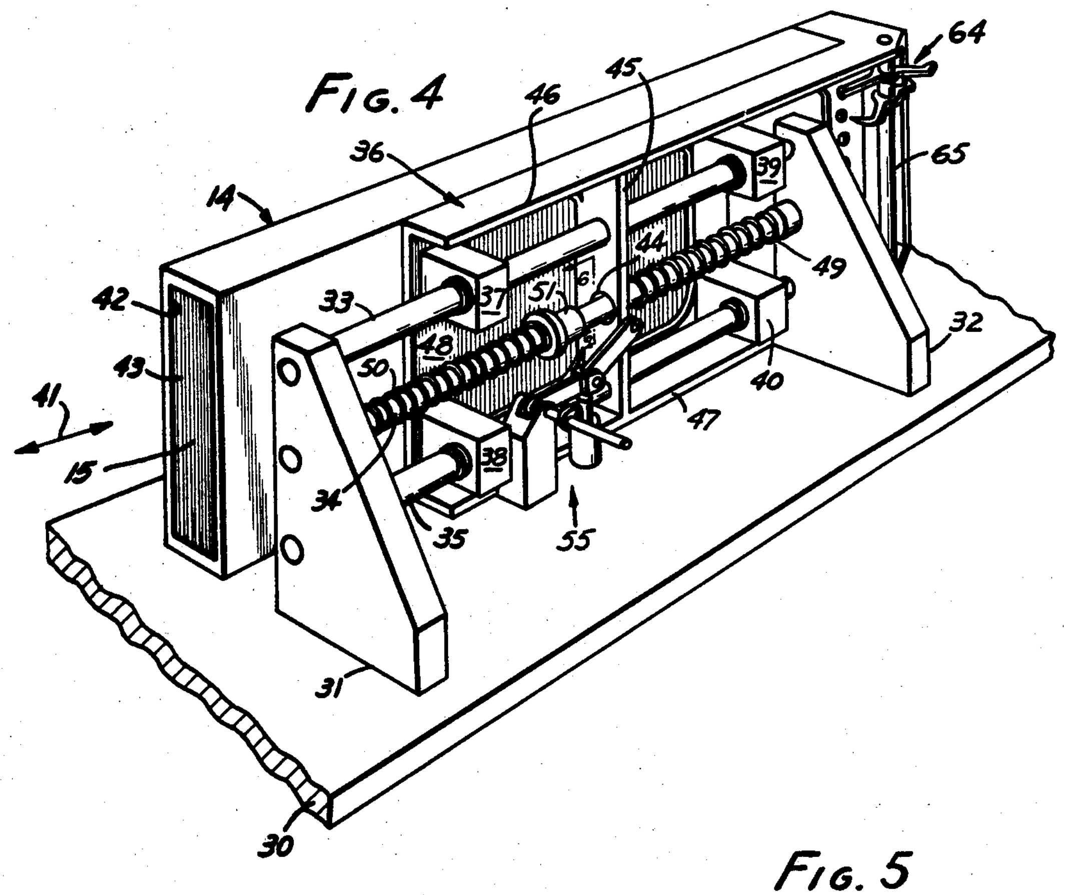
FIG. 4 is a perspective view of the presently preferred embodiment of the invention.

FIG. 4 shows the presently preferred embodiment of selection means according to the invention and, in particular, the means for ejecting a selected card from cassette 14. The device includes a base 30 with a pair of stanchions 31, 32. These stanchions support three parallel shafts 33, 34, 35. Shafts 33 and 35 act as tracks for a carriage 36, which carriage is supported on these shafts by four bearings 37, 38, 39, 40. This mounting technique permits the carriage to move back and forth in the direction indicated by arrow 41. The open end 42 of the cassette faces to the left in FIG. 4 and exposes edges 43 of a stack 15 of cards 10.

The carriage also carries a thrust bearing 44 on plate 45, which plate extends between a pair of flanges 46, 47 on a backing plate 48. The casette is mounted to this backing plate.

A pair of compression springs 49, 50 surround shaft 34 on opposite sides of plate 45. A spring stop 51 is rigidly fixed to the central portion of shaft 34 where it serves to pre-compress springs 49 and 50 at different times in the cyclical operation of the device. Between the respective springs and the stop are acceleration washer 52 and deceleration washer 53. These washers engage respective springs 49 and 50 and move freely along the shaft. The hole in their respective centers is of smaller diameter than the outer diameter of the stop so that they are held by the stop unless compressed by plate 45. The hole in plate 45 is large enough to pass over the stop but not large enough to pass over the washers, so that as the plate moves back and forth beyond the limits of stop 51, it bears against one or the other of washers 52 and 53 and further compresses the respective spring. It will now be seen that it is possible to compress spring 49 so as to store energy therein, then to release that energy to move the holder under an accelerating force toward the left in FIG. 4 until such point as plate 45 strikes washer 53 which decelerates the holder and will permit the unrestrained card to be ejected from the stack of cards while the rest are held within the holder.

Figure 5:
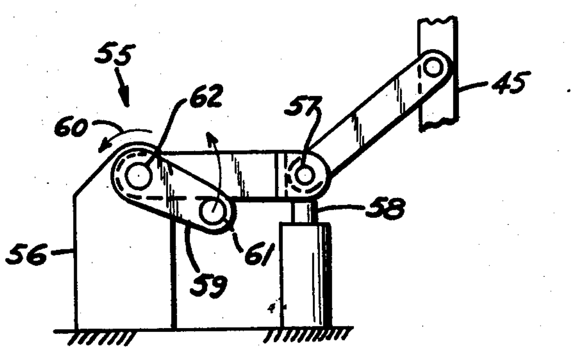
FIG. 5 is a side elevation of a portion of FIG. 4.
Figure 6:
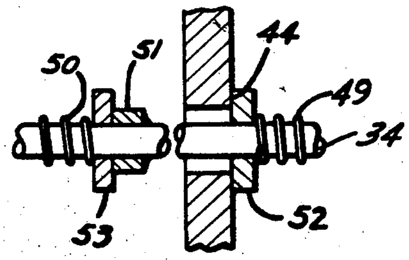
FIG. 6 is a cross-section taken at line 6—6 of FIG. 4.

The process may be repeated by again compressing spring 49 and then releasing it. A convenient spring loading means for accomplishing this cycling is shown in FIGS. 4 and 5 wherein a toggle linkage 55 is shown mounted to a block 56 on the base. The device is shown cocked over center with the toggle joint 57 bearing against a stop 58 (FIG. 5). A trigger 59 is pivotally mounted to block 56 and, when turned in the direction of arrow 60, will pull the toggle linkage over center and permit the cycle to start. A dog 61 engages the bottom portion of the toggle linkage to cause this release, by rotating the toggle linkage past its over-center position, so as to release the energy of the compressed spring. The carriage then is driven by spring 49 and is later decelerated by spring 50, which causes the carriage to rebound toward spring 49. In order to provide energy for the next cycle, the direction of rotation of shaft 62 may be reversed and driven by shaft 62 to cause the dog to impart sufficient additional energy to the carriage that on rebound from spring 50 the toggle will again go over center and will load the device for the next cycle.

There remains to be described the restraint and engagement means for actually engaging those cards which are not to be expelled. These means are shown only partially at the right-hand end of FIG. 4, and are carried by the holder. It will be understood that their operating position can be accomplished by hand or, if desired, by electromagnetic or other means. Through holes 63 in the cassette there may enter engagement means 64 comprising coded pins 25. It will be noted that these pins, instead of being the straight bars as used for schematic illustration in FIG. 1, are actually curved, and are adapted to move around the axis of rocker shaft 65. Only the upper pair of these pins is shown in FIG. 4, this corresponding to pair 32 of FIG. 2. In the illustration, the pin corresponding to the "1" position is inserted, and the pin corresponding to the "0" position is retracted. It will be understood that there will be one of these pins for each and every one of the pin locations together with a hole 63 therefor at each one of said hole locations and that these pins may pass through the entire stack of cards so as to make the necessary engagement.

The term "engagement means" is used for the pins themselves, and the term "restraint means" is used for shaft 65 and the means for setting the pins in position around said shaft. By means of a simple pivoting action around rocker shaft 65, the pins will be either inserted or removed from the coded holes.

Now assuming the restraint means to have placed pins in the stack to correspond to the code number of the card to be ejected and that the carriage is in the loaded position shown in FIG. 4, the dog is turned to move the toggle linkage over center, and the acceleration spring drives the holder rapidly to the left, thereby accelerating all of the cards by a uniform force on the coded edge. Shortly thereafter, plate 45 strikes the deceleration washer, and the deceleration of the carriage begins. At this time, all except the preselected card are held to the holder by the pins and are decelerated. However, the selected card continues to move and flies out of the holder where it is put to use. The deceleration continues until the carriage is stopped, and then the deceleration spring moves the holder in the opposite direction to compress the acceleration spring. The additional energy imparted by the dog will replace friction and other losses. The toggle may be lightly spring-loaded, if desired, to assure that it moves over center on the return stroke. When the toggle linkage strikes stop 58, then the device is locked loaded, and ready for the next selection. Before the next selection or at any other time, the card may or may not be returned and it will be obvious from the foregoing that it is immaterial to what place in the stack the card is returned. Should the same card be again desired, then there will be no change made in the pins which are inserted into the holder. If a different card is to be selected, then the pin code corresponding to the new card will be placed in the holder, and that card will be free for ejection on the next actuation.

Different cassettes may readily be inserted onto the carriage, and any number of these devices may be provided in association with the computer itself. It will thereby be recognized that this is a device of broad application.

This device has been shown accelerating and decelerating along linear axis 41. It will be recognized that any acceleration and deceleration, including rotational, is suitable, and that rocker shaft 65 might have been located at the center of rotation of a device rather than at one end, and that ejection depending on rotational acceleration and deceleration is as suitable and applicable as that which is shown herein in connection with linear acceleration and deceleration.

This invention is not to be limited by the embodiment which is shown in the drawings and described in the description which is given by way of example and not of limitation, but only in accordance with the scope of the appended claims.

I claim:

1. Card selection means for selecting a designated card from a stack of a plurality of said cards, said cards being stacked in a flat stack, with one edge of each card parallel to and adjacent to an edge of each of the other cards, there being retention means on each card near said edge, which retention means is respective to each individual card, and comprises a plurality of openings some of which are edge-accessed and some of which are not edge-accessed, said selection means comprising: a base; a track mounted to the base and extending parallel to an ejection axis; a carriage reciprocably movable on said track on the ejection axis; a holder mounted to said carriage and containing said cards in alignment with said ejection axis, said holder comprising a structure having an opening therethrough sufficient to pass every card in the stack when the card moves out of the holder in a path parallel to the ejection axis, the cards being held in the holder in a position parallel to said ejection axis; accelerator means for said carriage comprising a pair of opposed, compressible springs mounted to the base on opposite axial sides of structure on the carriage whereby to exert oppositely directed forces on the carriage, thereby to move the carriage along the ejection axis; spring loading means mounted to the base and adapted to force the carriage against one of said springs to compress the same and to store energy therein, said spring driving the carriage along the ejection axis when the carriage is released, the carriage next being decelerated by the second of said springs; and restraint means carried by the carriage having a plurality of engagement means adapted to engage respective ones of said retention means; and selector means so disposed and arranged as to cause respective ones of said engagement means to engage those retention means which will restrain to the holder all but designated ones of said cards, all non-selected cards being engaged at a non-accessed hole by at least one of said engagement means, and the selected card being unengaged because all engagement means which engage non-access holes of the non-selected cards enter edge-accessed holes of the selected card, whereby upon deceleration of the carriage by the second spring, all non-selected cards are retained in the holder, and the selected card is ejected.

2. Card selection means according to claim 1 in which the retention means on the card and the engagement means on the carriage are binary coded, whereby a specific binary number may be applied to a card, and a specific respective binary combination of engagement means permits the escape of that, and only that, card.

3. Card selection means according to claim 1 in which the spring-loading means includes a toggle linkage interposed between the carriage and the base, movement of the toggle over center compressing a first one of said springs to store energy for acceleration of the carriage when the toggle linkage is reversed past its over-center position.

4. Card selection means according to claim 3 in which means is provided for moving the toggle linkage over center during the rebound of the carriage from the second one of said springs.

References Cited

UNITED STATES PATENTS

| | | | |
|---|---|---|---|
| 2,315,860 | 4/1943 | Jones | 129—16.1 |
| 2,492,910 | 12/1949 | Welk | 129—16.1 |
| 2,524,918 | 10/1950 | McKeown | 129—16.1 |
| 2,544,251 | 3/1951 | Block | 129—16.1 |
| 2,600,940 | 6/1952 | Tullio | 124—16 X |
| 2,645,226 | 7/1953 | Walker et al. | 129—16.1 |
| 2,722,676 | 11/1955 | Begun. | |
| 3,266,497 | 8/1966 | Bleiman | 129—16.1 |
| 3,267,939 | 8/1966 | Ford et al. | 129—16.1 X |

JEROME SCHNALL, *Primary Examiner.*